United States Patent
Leroy et al.

(10) Patent No.: US 10,054,038 B2
(45) Date of Patent: Aug. 21, 2018

(54) METHOD FOR CONTROLLING A DUAL-SUPERCHARGED COMBUSTION ENGINE

(71) Applicant: IFP ENERGIES NOUVELLES, Rueil-Malmaison (FR)

(72) Inventors: Thomas Leroy, Saint Germain en Laye (FR); Alexandre Chasse, Paris (FR); Jonathan Chauvin, Paris (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 571 days.

(21) Appl. No.: 14/648,448

(22) PCT Filed: Oct. 21, 2013

(86) PCT No.: PCT/FR2013/052515
§ 371 (c)(1),
(2) Date: May 29, 2015

(87) PCT Pub. No.: WO2014/083248
PCT Pub. Date: Jun. 5, 2014

(65) Prior Publication Data
US 2015/0315960 A1 Nov. 5, 2015

(30) Foreign Application Priority Data
Nov. 30, 2012 (FR) .................................... 12 03260

(51) Int. Cl.
*F02B 37/04* (2006.01)
*F02B 29/04* (2006.01)
(Continued)

(52) U.S. Cl.
CPC .............. *F02B 37/04* (2013.01); *F02B 29/04* (2013.01); *F02B 29/0412* (2013.01);
(Continued)

(58) Field of Classification Search
CPC ........ F02M 26/00; F02M 26/06; F02B 29/04; F02B 39/04; F02B 29/0418;
(Continued)

(56) References Cited

U.S. PATENT DOCUMENTS 6,062,026 A * 5/2000 Woollenweber ........ F02B 37/04
60/605.2
7,529,615 B2 * 5/2009 Milos ...................... F02B 37/16
123/361
(Continued)

FOREIGN PATENT DOCUMENTS

DE 10124543 A1 11/2002
DE 102006062213 A1 6/2008
(Continued)

OTHER PUBLICATIONS

International Search Report for International Application No. PCT/FR2013/052515 dated Feb. 2, 2014 with English translation.
(Continued)

*Primary Examiner* — Jason Newton
(74) *Attorney, Agent, or Firm* — Fitch, Even, Tabin & Flannery LLP

(57) ABSTRACT

The invention relates to a combustion engine equipped with a dual supercharging system in which a mechanical compressor is driven by an electric motor. The method controls a combustion engine with the electric motor being controlled by determining a rotational speed setpoint for positive-displacement compressor using a supercharge volume filling model.

19 Claims, 7 Drawing Sheets

(51) Int. Cl.
  *F02B 39/04* (2006.01)
  *F02B 37/16* (2006.01)
  *F02B 37/24* (2006.01)
  *F02D 41/00* (2006.01)
  *F02D 23/00* (2006.01)
  *F02M 26/00* (2016.01)
  *F02B 39/10* (2006.01)
  *F02D 29/06* (2006.01)
  *F02M 26/06* (2016.01)

(52) U.S. Cl.
  CPC .......... *F02B 29/0418* (2013.01); *F02B 37/16* (2013.01); *F02B 37/24* (2013.01); *F02B 39/04* (2013.01); *F02D 23/00* (2013.01); *F02D 41/0007* (2013.01); *F02M 26/00* (2016.02); *F02B 39/10* (2013.01); *F02D 29/06* (2013.01); *F02D 2200/0402* (2013.01); *F02D 2200/0406* (2013.01); *F02D 2200/0414* (2013.01); *F02M 26/06* (2016.02); *Y02T 10/144* (2013.01); *Y02T 10/146* (2013.01)

(58) Field of Classification Search
  CPC ...... F02B 29/0412; F02B 37/16; F02B 37/24; F02B 39/10; F02D 23/00; F02D 41/0007; F02D 29/06; F02D 2200/0402; F02D 2200/0414; F02D 2200/0406
  USPC .......................................................... 60/608
  See application file for complete search history.

(56) References Cited

U.S. PATENT DOCUMENTS

| | | | | |
|---|---|---|---|---|
| 9,657,688 B2* | 5/2017 | Lutz | ........................ | F02M 26/10 |
| 9,689,354 B1* | 6/2017 | Beresford-Knox | .... | F02M 26/35 |
| 2004/0194465 A1* | 10/2004 | Bolz | ........................ | F02B 37/04 60/612 |
| 2004/0194466 A1* | 10/2004 | Kawamura | ............. | F02B 33/34 60/612 |
| 2005/0056012 A1* | 3/2005 | Wild | ........................ | F02B 37/04 60/602 |
| 2012/0079823 A1 | 4/2012 | Son et al. | | |
| 2013/0125544 A1* | 5/2013 | Mond | ..................... | F02D 23/00 60/611 |
| 2015/0240826 A1* | 8/2015 | Leroy | ................ | F02M 35/1038 415/1 |
| 2015/0315960 A1* | 11/2015 | Thomas | .................. | F02B 37/04 123/564 |
| 2016/0245155 A1* | 8/2016 | Iwata | ...................... | F02B 37/10 |

FOREIGN PATENT DOCUMENTS

| | | |
|---|---|---|
| DE | 102007022703 B3 | 11/2008 |
| DE | 102008034323 A1 | 2/2010 |
| DE | 102010027220 A1 | 1/2012 |
| EP | 1391595 A1 | 2/2004 |
| EP | 1462629 A1 | 9/2004 |
| EP | 1844222 A1 | 10/2007 |
| FR | 2949140 A1 | 2/2011 |
| WO | 2005071241 A1 | 8/2005 |

OTHER PUBLICATIONS

Canova, et al., Design and Validation of a Control-Oriented Model of a Diesel Engine with Two-Stage Turbocharger, General Motors Research, Development and Strategic Planning, 2009, vol. 2, Issue 2.

* cited by examiner

US 10,054,038 B2

METHOD FOR CONTROLLING A DUAL-SUPERCHARGED COMBUSTION ENGINE

CROSS REFERENCE TO RELATED APPLICATIONS

Reference is made to PCT Patent Application No. PCT/FR2013/052515, filed on Oct. 21, 2013, and French Patent Application No. 12/03.260, filed on Nov. 30, 2012, which applications are incorporated herein by reference in their entirety.

FIELD OF THE INVENTION

The present invention relates to the field of combustion engine control, and in particular to dual-supercharged combustion engines.

DESCRIPTION OF THE PRIOR ART

What is referred to as engine supercharging increases the amount of fuel/air mixture within the engine cylinders in relation to standard operation. Supercharging and a fortiori dual supercharging allows increasing the efficiency of a combustion engine without modifying the rotational speed thereof. Indeed, the engine torque (and therefore the power) depends on the angle formed between the connecting rod and the crankshaft, on the gas pressure within the cylinder, referred to as Mean Effective Pressure (or MEP), and on the amount of fuel supplied. For example, for a gasoline engine, if the amount of gasoline fed to the cylinder is increased, the mass of air (oxidizer) also needs to be increased proportionally to ensure complete combustion of this fuel (the same fuel/air ratio being kept).

To obtain such supercharging, the mass of gas at the intake is increased, which allows the amount of fuel to be increased. The gas mixture at the engine intake (essentially comprising air and optionally burnt gas) is therefore compressed. This compression can be performed by the compressor of a turbocharger that is driven by the exhaust gas through a turbine, or the compression can be carried out by a distinct mechanical compressor that can be driven by the engine crankshaft. Dual supercharging means that the gas mixture at the intake is compressed twice: for example, a first time by a compressor of the turbocharger and a second time by a mechanical compressor arranged in the engine intake circuit. Conventionally, the mechanical compressor, dynamically controlled, compensates for the inertia of the turbocharger.

In order to control the pressure of the intake air, referred to as boost pressure, it is possible to modify the behavior of the two compressors. On the one hand, to control the air passing through the mechanical compressor, a valve referred to as by-pass valve, arranged parallel to the compressor, is controlled to divert the air towards the compressor according to the opening thereof, which is controlled. Besides, when the compressor is driven by the engine crankshaft, a controllable clutch is positioned between a reducer and the mechanical compressor. The clutch allows activation or deactivation of the mechanical compressor. Conventionally, the mechanical compressor is deactivated for high engine speeds (the engine speed limit depends on the drive ratio between the crankshaft and the mechanical compressor). On the other hand, to control air compression by the turbocharger, the latter is equipped with a variable-geometry turbine (VGT) whose controlled geometry change causes a change in the rotational speed of the turbocharger and therefore in the compression.

At steady speeds, the mechanical compressor appears to be highly energy consuming in the case of direct connection with the crankshaft which results in an engine consumption increase.

From a transient viewpoint, it appears that the boost pressure is the result of two quantities controlled by the VGT turbine and the by-pass valve which are the pressure downstream from the turbocharger (i.e. upstream from the mechanical compressor) and the compression ratio of the mechanical compressor. These two quantities have different response times resulting in the pressure upstream from the mechanical compressor being slow in relation to the compression ratio of the mechanical compressor due to the turbocharger inertia. The dual supercharging control has to drive the two components so as to ensure fast response.

A dual supercharging control method thus has to meet the following three objectives:
- provide the boost pressure required to reach the load requested by the driver. This regulation should be as fast as possible without generating any oscillation or significant overshoot (for example over 150 mbar),
- adhere to the optimum operating point regarding consumption, which deactivates the mechanical compressor when it is not necessary for reaching the required pressure, and
- be robust with respect to the dispersions of the various detectors and of the components of the supercharging system, which continue to meet the specifications in the presence of these dispersions.

BACKGROUND OF THE INVENTION

EP Patent 1,844,222 describes a dual-supercharged combustion engine and a dual supercharging control method. The engine described in this document comprises an additional controllable valve between the turbocharger and the mechanical compressor, which makes the system more complex to achieve and to control (the number of actuators to be controlled is larger). In addition, the control method described in this document does not take account of the physical behavior of the gas flows at the intake.

To overcome these problems, the invention relates, on the one hand, to a combustion engine equipped with a dual supercharging system in which a mechanical compressor is driven by an electric motor and, on the other hand, controlling a combustion engine, wherein the electric motor is controlled by determining a rotational speed setpoint for the positive-displacement compressor using a supercharged volume filling model. Using an electric motor allows reducing of the supercharging energy cost and to achieve faster transient responses at low rotational speeds. The model allows accounting for the physical behavior of the gas flows at the intake. Furthermore, the rotation setpoint of the positive-displacement compressor allows controlling supercharging in a fast, robust and energetically optimal manner.

SUMMARY OF THE INVENTION

The invention relates to a method for controlling a combustion engine equipped with a supercharging system, the supercharging system comprising a turbocharger and a positive-displacement compressor for compressing a gas mixture at the intake of the combustion engine and a by-pass circuit arranged parallel to the positive-displacement compressor, comprising a controllable by-pass valve, the positive-displacement compressor being driven by an electric motor. The method comprises carrying out the following steps:

a) acquiring a boost pressure setpoint $P_{sural}^{sp}$;
b) constructing a filling model for a supercharged volume contained between the intake valves of the engine on the one hand and the positive-displacement compressor and the by-pass valve on the other;
c) converting the boost pressure setpoint $P_{sural}^{sp}$ to a rotational speed setpoint $N_{cpr}^{sp}$ for the positive-displacement compressor using the supercharged volume filling model; and
d) controlling the electric motor according to the rotational speed setpoint $N_{cpr}^{sp}$ of the positive-displacement compressor.

According to the invention, a pressure $P_{avcpr}$ and a temperature $T_{avcpr}$ are determined upstream from the positive-displacement compressor, as well as a boost pressure $P_{sural}$ and a boost temperature $T_{sural}$ at the intake of the engine, the supercharged volume filling model connecting boost pressure $P_{sural}$ to rotational speed $N_{cpr}$ of the positive-displacement compressor with the pressure $P_{avcpr}$ and the temperature $T_{avcpr}$ upstream from the positive-displacement compressor, as well as the boost temperature $T_{sural}$.

Advantageously, the boost pressure $P_{sural}$ and temperature $T_{sural}$ are determined by pressure and temperature detectors respectively arranged upstream from the intake manifold of the engine.

Advantageously, the pressure $P_{avcpr}$ and the temperature $T_{avcpr}$ upstream from the positive-displacement compressor are determined by pressure and temperature detectors respectively arranged upstream from the positive-displacement compressor or by an estimator depending on the boost pressure $P_{sural}$ and temperature $T_{sural}$.

Preferably, the filling model is determined by a filling equation of the supercharge volume defined by a flow rate conservation formula of the type:

$$\dot{P}_{sural} = \frac{RT_{sural}}{V_{sural}}(D_{cpr} - D_{bp} - D_{asp})$$

with $\dot{P}_{sural}$ being the derivative of the boost pressure $P_{sural}$ with respect to time, R being the ideal gas constant, $V_{sural}$ being the supercharge volume, $D_{cpr}$ the flow coming from the positive-displacement compressor, $D_{bp}$ being the flow leaving through the by-pass valve that is a function of the opening of the by-pass valve and $D_{asp}$ being the flow into the cylinders of the engine.

Advantageously, the flow $D_{bp}$ leaving through the by-pass valve is determined by a pressure drop relation at the by-pass valve, notably by a Barré Saint Venant equation of the type: $D_{bp}=A_{bp}(\text{Bypass})\times f(P_{avcpr},P_{sural},T^{avcpr})$ with $A_{bp}(\text{Bypass})$ being the opening area of the by-pass valve and f being the flow rate per unit of area defined by a formula of the type:

$$f(P_{avcpr}, P_{sural}, T_{avcpr}) = \frac{P_{sural}}{\sqrt{RT_{avcpr}}}$$

$$\begin{cases} \left(\frac{P-avcpr}{P_{sural}}\right)^{\frac{1}{\gamma}} \sqrt{\frac{2}{\gamma-1}\left(1-\left(\frac{P_{avcpr}}{P_{sural}}\right)^{\frac{\gamma-1}{\gamma}}\right)} & \text{if } \left(\frac{P_{avcpr}}{P_{sural}}\right) > \left(\frac{2}{\gamma+1}\right)^{\frac{\gamma}{\gamma+1}} \\ \left(\frac{2}{\gamma+1}\right)^{\frac{\gamma+1}{\gamma-1}} & \text{if } \left(\frac{P_{avcpr}}{P_{sural}}\right) \leq \left(\frac{2}{\gamma+1}\right)^{\frac{\gamma}{\gamma+1}} \end{cases}$$

with $\gamma$ the specific capacity ratio of the gases.

According to one embodiment of the invention, the filling model is an open-loop filling model written with a relation of the type:

$$N_{cpr}^{sp} = \phi^{-1}\left(\frac{\frac{P_{sural}^{sp} \cdot V_{sural}}{R \cdot T_{sural}} + A_{bp}(\text{Bypass})\cdot f(P_{avcpr}, P_{sural}^{sp}, T_{avcpr}) + D_{asp}^{sp}}{\rho_{avcpr}},\right.$$

$$\left.\frac{P_{sural}^{sp} + \delta P}{P_{avcpr}}\right)$$

with $\rho_{avcpr}$ being the density of the gases flowing through the positive-displacement compressor, given by $$\rho_{avcpr} = \frac{P_{avcpr}}{RT_{avcpr}},$$

$\phi$ being the volumetric flow rate of the mechanical compressor, $D_{asp}^{sp}$ being the setpoint flow of gas sucked into the cylinders of the engine and $\delta P$ being the pressure drop in an air cooler positioned between the turbocharger and the mechanical compressor.

Alternatively, the filling model is a closed-loop filling model written with a relation of the type:

$$N_{cpr}^{sp} = $$

$$\phi^{-1}\left(\frac{\frac{P_{sural}^{sp} \cdot V_{sural}}{R \cdot T_{sural}} + \delta_{PI} + A_{bp}(\text{Bypass})\cdot f(P_{avcpr}, P_{sural}^{sp}, T_{avcpr}) + D_{asp}^{sp}}{\rho_{avcpr}},\right.$$

$$\left.\frac{P_{sural}^{sp} + \delta P}{P_{avcpr}}\right)$$

with $\delta^{PI}=-K_p(P_{sural}-P_{sural}^{sp})-K_i\int_0^t(P_{sural}-P_{sural}^{sp})dt$, $\rho_{avcpr}$ being the density of the gases flowing through the positive-displacement compressor given by $$\rho_{avcpr} = \frac{P_{avcpr}}{RT_{avcpr}},$$

$\phi$ being the volumetric flow rate of the mechanical compressor, $D_{asp}^{sp}$ being the setpoint flow of gas into the cylinders of the engine, $\delta P$ being the pressure drop in an air cooler positioned between the turbocharger and the mechanical compressor, $K_i$ and $K_p$ being calibration parameters of the feedback loop.

Furthermore, the by-pass valve can be closed when the electric motor is controlled.

Preferably, the by-pass valve is closed when the pressure difference between the boost pressure setpoint $P_{sural}^{sp}$ and the pressure upstream from the positive-displacement compressor $P_{avcpr}$ is greater than a threshold, the by-pass valve being open otherwise.

The invention also relates to a combustion engine equipped with a supercharging system, the supercharging system comprising a turbocharger and a positive-displacement compressor for compressing a gas mixture at the intake of the combustion engine and a by-pass circuit arranged parallel to the positive-displacement compressor, comprising a controllable by-pass valve, the positive-displacement compressor being driven by an electric motor. The engine also comprises means for implementing the method as described above.

According to an embodiment of the invention, the electric motor is powered by a generator positioned on the crankshaft of the combustion engine.

Alternatively, the electric motor is powered by an electric battery.

Advantageously, the mechanical power of the positive-displacement compressor ranges between 2 and 5 kW.

BRIEF DESCRIPTION OF THE DRAWINGS

Other features and advantages of the method according to the invention will be clear from reading the description hereafter of embodiments given by way of non-limitative example, with reference to the accompanying figures wherein.

DETAILED DESCRIPTION OF THE INVENTION

Figure 1:
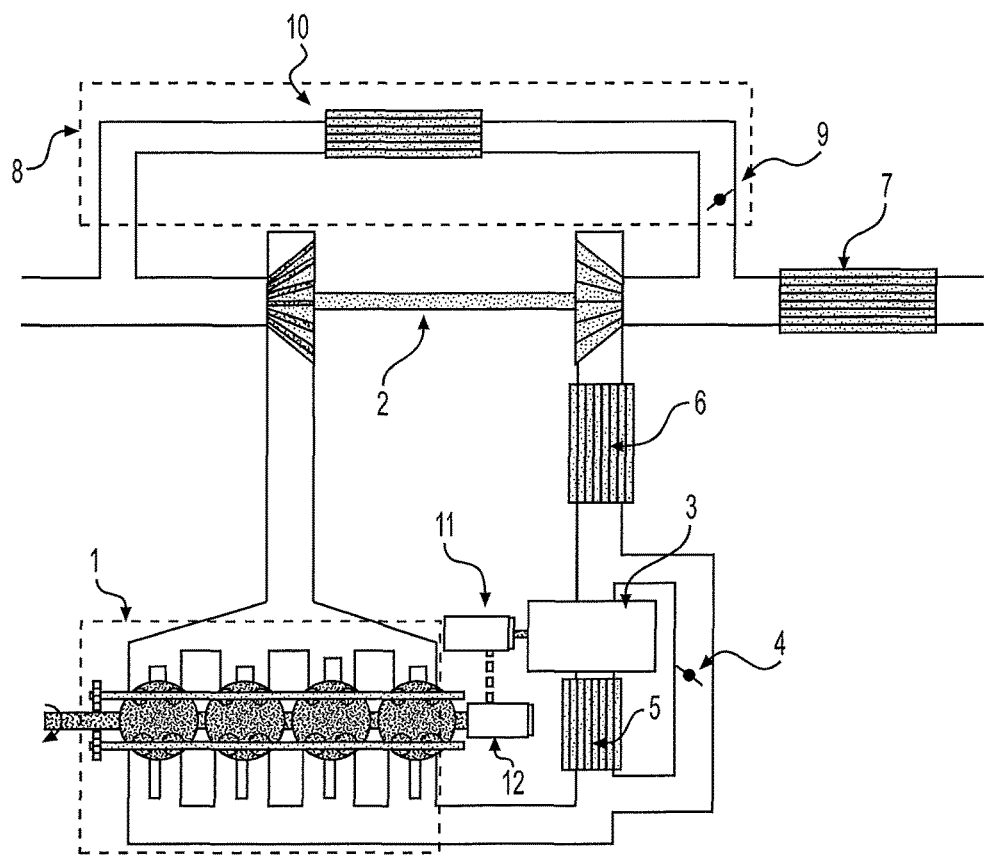
FIG. 1 illustrates a dual-supercharged combustion engine according to the invention.

The invention relates to a method for controlling a combustion engine provided with a dual supercharging system comprising a turbocharger compressor and a positive-displacement compressor and a by-pass valve being mounted parallel thereto. According to the invention, the positive-displacement compressor is driven by an electric motor. FIG. 1 shows a dual-supercharged combustion engine according to an embodiment of the invention. An engine (1) is equipped with an intake circuit and an exhaust circuit. The intake circuit comprises, in the direction of air flow an air filter (7), the compressor of turbocharger (2), a first charge air cooler (6), a positive-displacement compressor (3) and a second charge air cooler (5). A by-pass circuit comprising a by-pass valve (4) is mounted parallel to the mechanical compressor. The turbine of turbocharger (2) is a variable-geometry turbine (VGT) arranged in the exhaust circuit. Charge air coolers (5, 6) allow to cooling the air heated during the successive compressions.

Positive-displacement compressor (3) is driven by an electric motor (11), which is driven to control the boost pressure in order to obtain the required load for engine (1). According to the embodiment shown in FIG. 1, the electric motor is powered by a generator (12) positioned on the crankshaft of engine (1). Alternatively, electric motor (11) is powered by an electric battery (not shown) integrated in the vehicle. Positive-displacement compressor (3) is driven by an electric motor (11) which allows faster boost pressure control, notably for transient conditions, in comparison with the by-pass valve control.

In addition, as shown, the engine can comprise an exhaust gas recirculation (EGR) circuit (8) including a cooler (10) and a valve (9) referred to as EGR valve. The circulating burnt gas mixes with the fresh air between air filter (7) and the compressor of turbocharger (2). Engine (1) as shown comprises four cylinders. The latter two characteristics (EGR and number of cylinders), as well as the use of charge air coolers, are independent of the invention and not limitative thereof.

Figure 2:
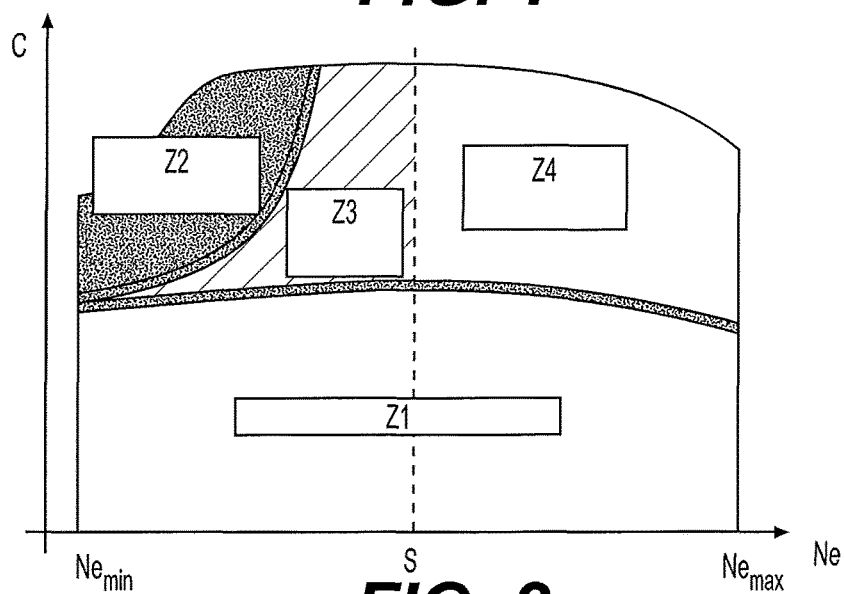
FIG. 2 illustrates the zones of use of a mechanical compressor in an engine speed, torque plane.

FIG. 2 shows, in a graph of torque C as a function of engine speed Ne, various dual supercharging use zones. In zone Z1, for low torques, the running conditions are referred to as atmospheric, that is, the intake pressure is at atmospheric pressure, which corresponds to the conventional running conditions of the non-supercharged combustion engine. In zone Z2, at low engine speed, the turbocharger is not sufficient for increasing the boost pressure, the by-pass valve and the positive-displacement compressor are used, the VGT actuator being then positioned at the optimum efficiency of the turbomachine. To reduce the consumption, when possible, the positive-displacement compressor is used as little as possible, that is, charging is performed of the turbocharger via the VGT actuator (zone Z4). In hatched zone Z3, the positive-displacement compressor is used only for transient conditions in order to compensate for the supercharger slowness. In this figure, S designates a predetermined threshold beyond which the positive-displacement compressor is not used and S is determined as a function of the maximum allowable positive-displacement compressor speed (from manufacturer's data).

The method according to the invention relates to the control of a dual-supercharged combustion engine. Control of the combustion engine involves carrying out the following stages:

1) Determining pressures and temperatures within the intake circuit

2) Acquiring a boost pressure setpoint

3) Constructing a filling model

4) Calculating the rotational speed setpoint for the positive-displacement compressor 5) Controlling the electric motor 6) Controlling the by-pass valve.

The latter stage of controlling the by-pass valve is optional.

Notations

In the description, the terms "upstream" and "downstream" are defined with respect to the direction of flow of the gases at the engine intake and exhaust. Additionally, the following notations are used:

$P_{avcpr}$ and $T_{avcpr}$ are the pressure and temperature upstream from positive-displacement compressor (3), at the outlet of first charge air cooler (6);

$P_{sural}$ and $T_{sural}$ are the pressure and temperature at the intake of engine (1) and downstream from positive-displacement compressor (3);

$V_{sural}$ is the supercharged volume contained between the intake valves of engine (1) on the one hand and between positive-displacement compressor (3) and by-pass valve (4) on the other hand;

$P_{apcpr}$ is the pressure downstream from positive-displacement compressor (3) and upstream from second charge air cooler (5);

Bypass is the open position of by-pass valve (4);

$N_{cpr}$ is the speed of positive-displacement compressor (3);

R is the specific ideal gas constant and it is the same for all the gases concerned here (air and exhaust gas), which is 288 J/kg/K;

$D_{cpr}$ is the mass flow rate of air at the outlet of positive-displacement compressor (3);

$D_{bp}$ is the mass flow rate of air flowing through by-pass valve (4);

$D_{asp}$ is the mass flow rate of air sucked in by the cylinders of engine (1);

$A_{bp}$ is the opening area of by-pass valve (4);

γ is the specific capacity ratio of the gases which is considered for the gas mixture (air and exhaust gas) that γ=1.4;

$ρ_{avcpr}$ is the density of the gases flowing through positive-displacement compressor (3) given by $$\rho_{avcpr} = \frac{P_{avcpr}}{RT_{avcpr}};$$

φ is the volumetric flow rate of positive-displacement compressor (3). The volumetric flow rate is obtained from data maps that can be part of the data provided by the supplier of positive-displacement compressor (3);

δP is the pressure drops in charge air cooler (6) positioned between turbocharger (2) and positive-displacement compressor (3) which is mapped as a function of the positive-displacement compressor speed and of the gas density, $K_i$ and $K_p$ are the calibration parameters of the feedback loop for the closed-loop embodiment;

PME is the mean effective pressure which corresponds to the ratio of the work done by engine (1) during one cycle to the displacement of engine (1); and VGT is the opening of the turbine of turbocharger (2).

These notations, when followed by superscript $-^{sp}$, represent the setpoints associated with the quantities considered. Superscript $-^{mes}$ stands for the measured values. The derivative with respect to time is indicated by a dot above the variable considered.

Stage 1) Determining Pressures and Temperatures within the Intake Circuit

In order to control supercharging and notably the speed (rotational speed) of the positive-displacement compressor, the method according to the invention requires knowledge of physical quantities within the intake circuit. These quantities are pressure $P_{avcpr}$ and temperature $T_{avcpr}$ upstream from positive-displacement compressor (3), as well as boost pressure $P_{sural}$ and temperature $T_{sural}$ at the intake of engine (1).

These physical quantities can be measured by pressure and temperature detectors, or determined using an estimator.

Figure 3:
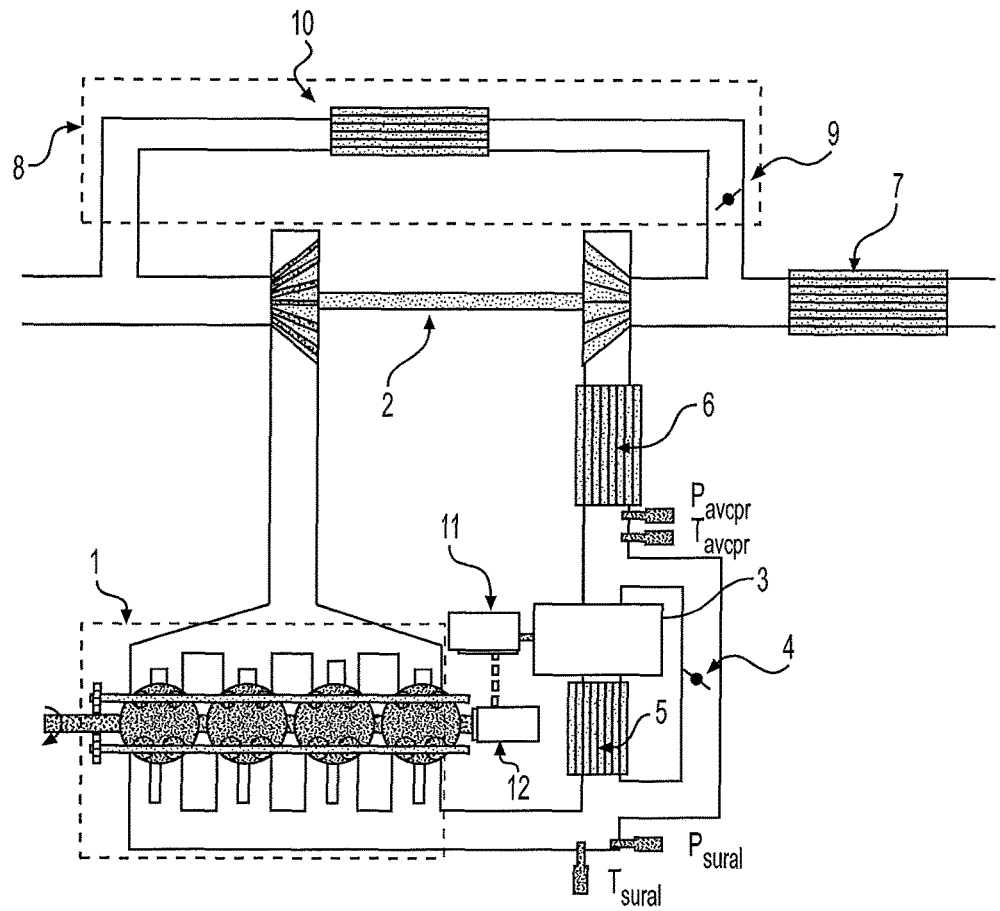
FIG. 3 illustrates an instrumented combustion engine according to the invention.

According to an embodiment illustrated in FIG. 3, four detectors are positioned within the intake circuit. A pressure $P_{avcpr}$ and a temperature $T_{avcpr}$ are measured at the outlet of first charge air cooler (6), and a boost pressure $P_{sural}$ and temperature $T_{sural}$ are measured at the outlet of second charge air cooler (5).

Alternatively, only boost pressure $P_{sural}$ and temperature $T_{sural}$ are measured at the outlet of second charge air cooler (5) and a pressure $P_{avcpr}$ and a temperature $T_{avcpr}$ are determined by an estimator. For example, pressure $P_{avcpr}$ is estimated using an estimator based on a dynamic model in the volume upstream from the positive-displacement compressor involving the flow rate conservation law and temperature $T_{avcpr}$ is determined using a data map of charge air cooler (6) and estimated pressure $P_{avcpr}$.

Stage 2) Acquiring a Boost Pressure Setpoint

A boost pressure setpoint $P_{sural}^{sp}$ which allows reaching the behavior (torque) requested from combustion engine (1) is acquired. This setpoint is given by the upper stage of the engine control. It is usually mapped as a function of the MIP (the Mean Indicated Pressure is the mean specific pressure on the piston surface during a double compression-expansion stroke) and of the engine speed.

Stage 3) Constructing the Filling Model

A filling model of the supercharged volume is constructed. The supercharged volume is defined, on the one hand, by the engine intake valves and, on the other, by positive-displacement compressor (3) and by-pass valve (4). The filling model relates boost pressure $P_{sural}$ to rotational speed $N_{cpr}$ of positive-displacement compressor (3). Advantageously, the filling model relates boost pressure $P_{sural}$ to rotational speed $N_{cpr}$ of positive-displacement compressor (3) by pressure $P_{avcpr}$ and temperature $T_{avcpr}$ upstream from positive-displacement compressor (3) and of the boost temperature $T_{sural}$. The filling model represents the filling of the supercharged volume and accounts for the physical phenomena involved for this filling.

According to an embodiment of the invention, the evolution of the pressure downstream from the positive-displacement compressor is governed by the filling dynamics of the volume located upstream from the valves. This dynamics is written with a formula of the type:

$$\dot{P}_{sural} = \frac{RT_{sural}}{V_{sural}}(D_{cpr} - D_{bp} - D_{asp})$$

The intake flow $D_{asp}$ is given by the engine filling model and is a static model relating the intake flow sucked into the cylinders to the quantities at the intake. This type of model is conventionally used in engine controls and it can be of the type $D_{asp}$=function($P_{sural}$,$T_{sural}$,Ne). This model thus is a function of the boost pressure;

The flow passing through the by-pass valve, $D_{bp}$, is written as follows:

$$D_{bp}=A_{bp}(\text{Bypass}) \cdot f(P_{avcm},P_{sural},T_{avcm})$$

with $A_{bp}$(Bypass) being the opening area of the by-pass valve and f being the flow rate per unit of surface given by the Saint-Venant relation as follows (pressure drop relation at the by-pass valve):

$$f(P_{avcpr}, P_{sural}, T_{avcpr}) = \frac{P_{sural}}{\sqrt{RT_{avcpr}}}$$

$$\begin{cases} \left(\frac{P_{avcpr}}{P_{sural}}\right)^{\frac{1}{\gamma}} \sqrt{\frac{2}{\gamma-1}\left(1-\left(\frac{P_{avcpr}}{P_{sural}}\right)^{\frac{\gamma-1}{\gamma}}\right)} & \text{if } \left(\frac{P_{avcpr}}{P_{sural}}\right) > \left(\frac{2}{\gamma+1}\right)^{\frac{\gamma}{\gamma+1}} \\ \left(\frac{2}{\gamma+1}\right)^{\frac{\gamma+1}{\gamma-1}} & \text{if } \left(\frac{P_{avcpr}}{P_{sural}}\right) \leq \left(\frac{2}{\gamma+1}\right)^{\frac{\gamma}{\gamma+1}} \end{cases}$$

The mechanical compressor flow rate $D_{cpr}$ can be written as the product of the volume flow rate with the upstream gas density:

$$D_{cpr} = \phi\left(N_{cpr}, \frac{P_{apcpr}}{P_{avcpr}}\right)\rho_{avcpr}$$

with $$\phi\left(N_{cpr}, \frac{P_{apcpr}}{P_{avcpr}}\right)$$

being the mapped volume flow rate (given by the supplier of the mechanical compressor), and $\rho_{avcpr}$ is the density of the gases flowing through the mechanical compressor given by $\rho_{avcpr} = P_{avcpr}/RT_{avcpr}$. Pressure $P_{apcpr}$ downstream from mechanical compressor (3) and upstream from charge air cooler (5) is related to the boost pressure by adding a pressure drop term $\delta P$ in charge air cooler (5): $P_{apcpr} = P_{sural} + \delta P$.

This pressure drop term $\delta P$ is mapped as a function of speed $N_{cpr}$ of the positive-displacement compressor and of gas density $\rho_{avcpr}$.

By replacing the expression of the three flow rates in the first relation, the boost pressure dynamics can be written with a formula of the type:

$$\dot{P}_{sural} = \frac{RT_{sural}}{V_{sural}}\left(\phi\left(N_{cpr}, \frac{P_{sural}+\delta P}{P_{avcpr}}\right)\rho_{avcpr} - A_{bp}(\text{Bypass}) \cdot f(P_{avcpr}, P_{sural}, T_{avcpr}) - D_{asp}\right)$$

where $N_{cpr}$ and $P_{sural}$ represent the control and the output of the system to be controlled. This relation is a filling model for the supercharged volume.

Stage 4) Calculating the Speed Setpoint for the Positive-Displacement Compressor Speed setpoint $N_{cpr}^{sp}$ of positive-displacement compressor (3) is determined by the filling model determined in the previous stage and of boost pressure setpoint $P_{sural}^{sp}$.

According to the embodiment described in the previous stage, in order to determine speed setpoint $N_{cpr}^{sp}$ of positive-displacement compressor (3), the relation obtained is inverted and applied to boost pressure setpoint $P_{sural}^{sp}$. Analysis of the system shows that the by-pass valve needs to remain closed in order to limit the losses and the pressure thus is controlled by the rotational speed of the compressor. The position of the by-pass valve is however used to determine the rotational speed control in order to account for of the closing dynamics. This system being invertible, the compressor rotational speed control for achieving a boost pressure setpoint is given by a formula of the type:

$$N_{cpr}^{sp} = \phi^{-1}\left(\frac{\frac{\dot{P}_{sural}^{sp} \cdot V_{sural}}{R \cdot T_{sural}} + A_{bp}(\text{Bypass}^{mes}) \cdot f(P_{avcpr}, P_{sural}, T_{avcpr}) + D_{asp}}{\rho_{avcpr}}, \frac{P_{sural}+\delta P}{P_{avcpr}}\right)$$

This control law is then slightly modified. Boost pressure $P_{sural}$ and intake flow $D_{asp}$ are replaced by their setpoints. The intake flow setpoint can be directly given by the upper stage of the engine control or it can be determined by the engine filling model where the boost pressure setpoint is considered. For example, the model can be written as follows: $D_{asp}^{sp} = \text{function}(P_{sural}^{sp}, T_{sural}, Ne)$. This allows the robustness of the control law to be increased. With an open loop, the calculation of speed setpoint $N_{cpr}^{sp}$ of the positive-displacement compressor can be written by a relationship of the type:

$$N_{cpr}^{sp} = \phi^{-1}\left(\frac{\frac{\dot{P}_{sural}^{sp} \cdot V_{sural}}{R \cdot T_{sural}} + A_{bp}(\text{Bypass}^{mes}) \cdot f(P_{avcpr}, P_{sural}^{sp}, T_{avcpr}) + D_{asp}^{sp}}{\rho_{avcpr}}, \frac{P_{sural}^{sp}+\delta P}{P_{avcpr}}\right)$$

Dynamic term $\dot{P}_{sural}^{sp}$ allows action as a transient accelerator.

Stage 5) Controlling the Electric Motor

Once speed setpoint $N_{cpr}^{sp}$ of positive-displacement compressor (3) has been determined, this setpoint is applied to electric motor (11) that drives the positive-displacement compressor to reach the desired boost pressure setpoint $P_{sural}^{sp}$. Thus, the desired engine load is obtained.

Stage 6) Controlling the by-Pass Valve

The control of by-pass valve (4) of positive-displacement compressor (3) becomes an on-off control. It has to be closed when in the zone of use of positive-displacement compressor (3) and open otherwise. This control is directly related to the pressure difference between boost pressure setpoint $P_{sural}^{sp}$ and pressure measurement $P_{avcpr}$ upstream from the positive-displacement compressor. When the latter is greater than a threshold (boost pressure not achieved by the turbocharger alone), by-pass valve (4) is closed with by-pass valve (4) being open in the opposite case. Hysteresis can be added in order to limit the number of openings and closings of by-pass valve (4).

The invention also relates to a dual-supercharged combustion engine where the positive-displacement compressor is driven by an electric motor. This combustion engine uses the control process as described above.

The method according to the invention is suited for controlling combustion engines, notably for vehicles and more specifically motor vehicles. The combustion engine concerned can be a gasoline engine or a diesel engine.

Variant Embodiments

According to one variant embodiment of the invention, a feedback is achieved to determine speed setpoint $N_{cpr}^{sp}$ of the positive-displacement compressor, which is also referred to as closed-loop control. This allows decreasing the static error between the measured boost pressure and the setpoint thereof.

To reach this goal, it is desirable to force the trajectory of boost pressure $P_{sural}$ to follow the trajectory of its setpoint $P_{sural}^{sp}$. Therefore, a relationship is imposed of the type: $\dot{P}_{sural} - \dot{P}_{sural}^{sp} = -K_p(P_{sural} - P_{sural}^{sp}) - K_i \int_0^t (P_{sural} - P_{sural}^{sp}) dt$. Gains $K_p$ and $K_i$ are calibration parameters. Considering the structure of the controller, these gains are constants valid over the entire operating range, which allow accounting for the non-linearity of the system.

This correction shows a proportional term and an integral term of the error. The dynamics inversion is then achieved exactly as in stage 4 where speed setpoint $N_{cpr}^{sp}$ of the positive-displacement compressor is calculated. We then obtain a closed-loop control of the form:

$$N_{cpr}^{sp} = \phi^{-1}\left(\frac{\frac{P_{sural}^{sp} \cdot V_{sural}}{R \cdot T_{sural}} + \delta_{PI} + A_{bp}(Bypass^{mes}) \cdot}{\rho_{avcpr}}, \frac{P_{sural}^{sp} + \delta P}{P_{avcpr}}\right)$$

with $\delta^{PI} = -K_p(P_{sural} - P_{sural}^{sp}) - K_i \int_0^t ((P_{sural} - P_{sural}^{sp}) dt$.

Advantageously, the feedback term is extracted from multiplying factor $RT^{sural}/V_{sural}$. This ratio being quasi-constant, it goes into the values of calibration parameters $K_p$ and $K_i$.

According to a second variant embodiment of the invention, variable-geometry turbocharger VGT (2) can be controlled by a setpoint determined from mapping turbocharger (2).

Application Examples

In order to check the behavior of the combustion engine with the method according to the invention, simulations were performed with the open-loop control and the closed-loop control for the combustion engine instrumented according to FIG. 3. For these simulations, the predetermined threshold S of use of the mechanical compressor is set at 3000 rpm. FIGS. 4 to 6 correspond to the open-loop control as described in stage 4) and FIGS. 7 and 8 correspond to the closed-loop control as described in the variant embodiments paragraph.

Figure 4A:
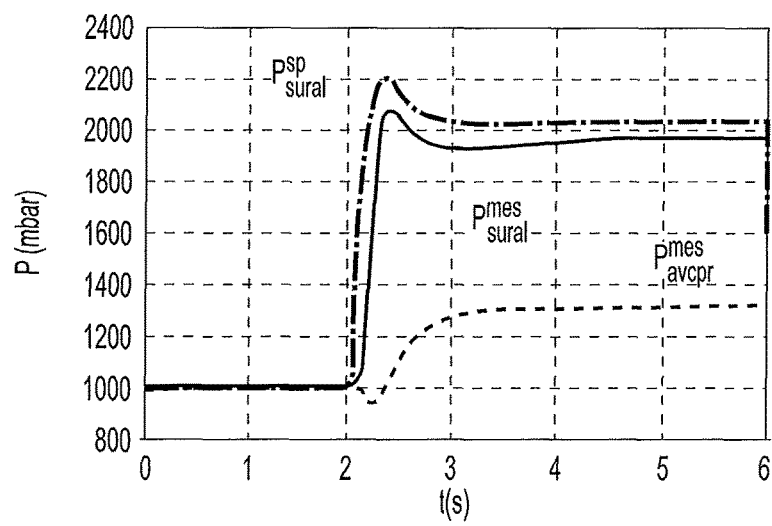
FIGS. 4a) to 4d) illustrate the boost pressure, the speed of the positive-displacement compressor, the opening of the by-pass valve and the opening of the VGT turbine for an open-loop control according to an embodiment of the method of the invention for an engine speed of 1000 rpm.
Figure 4B:
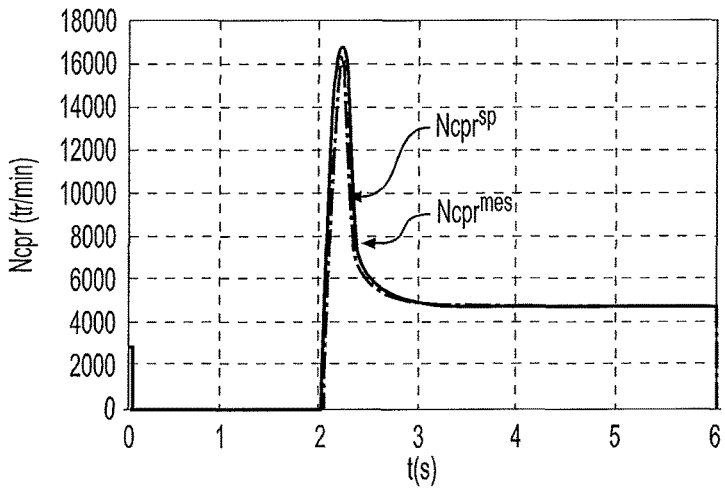
Figure 4C:
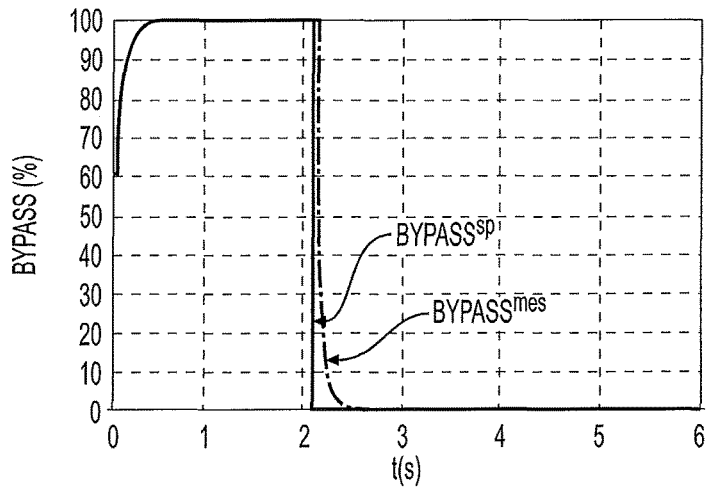
Figure 4D:
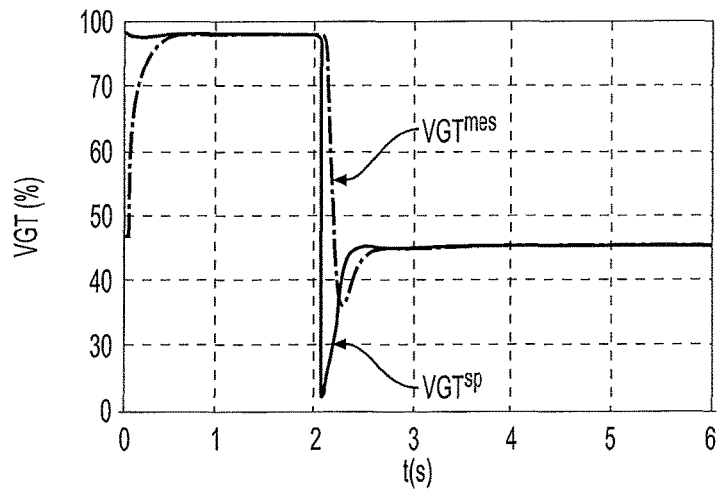

FIGS. 4a) to 4d) illustrate charging at an engine speed of 1000 rpm (zone Z2 in FIG. 2). FIG. 4a) shows the setpoint $P_{sural}^{sp}$ and measured $P_{sural}^{mes}$ boost pressure, as well as the pressure measured upstream from the positive-displacement compressor $P_{avcpr}^{mes}$. FIG. 4b) shows the setpoint and the measured value of positive-displacement compressor speed $N_{cpr}$. FIGS. 4c) and 4d) show the openings of the air actuators, of the by-pass valve and of the VGT (setpoint and measured values). For all these figures, the openings are expressed in % with 0% meaning that the actuator is closed while 100% means that the actuator is completely open. The torque request occurs at 2 seconds. The required boost pressure is then about 2200 mbar.

For these simulations, the opening of turbocharger VGT (2) is positioned by a map plus a term proportional to the boost pressure error, and the VGT closes at the beginning of the transient state. By-pass valve (4) closes totally to allow a positive-displacement compressor (3) to be used. Additionally, the rotational speed of positive-displacement compressor (3) increases greatly, then drops and returns to a constant value under steady-state conditions. The significant compressor speed increase has the effect of speeding up the boost pressure response by compensating for the turbocharger slowness (the turbocharger control output being the pressure upstream from the positive-displacement compressor).

Figure 5A:
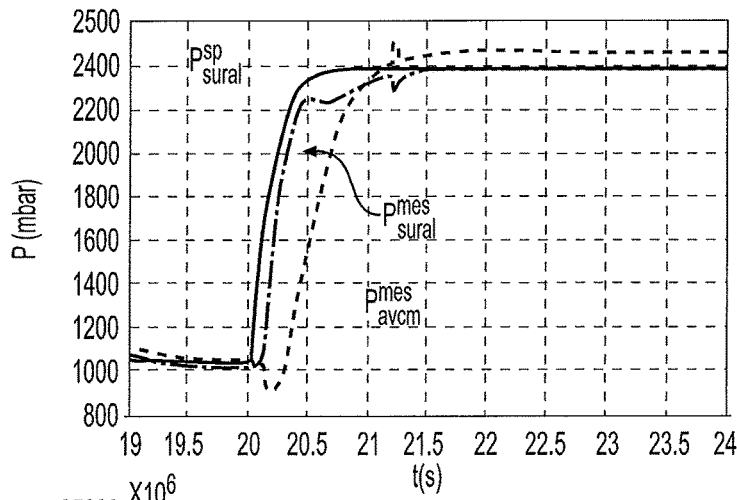
FIGS. 5a) to 5d) illustrate the boost pressure, the speed of the positive-displacement compressor, the opening of the by-pass valve and the opening of the VGT turbine for an open-loop control according to an embodiment of the method of the invention for an engine speed of 2500 rpm.
Figure 5B:
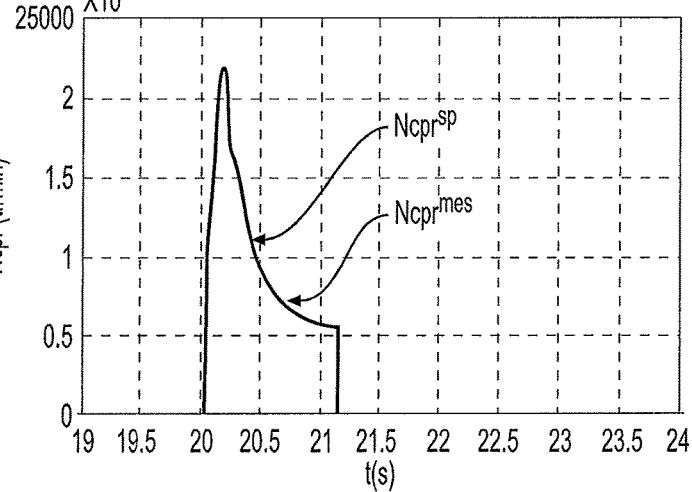
Figure 5C:
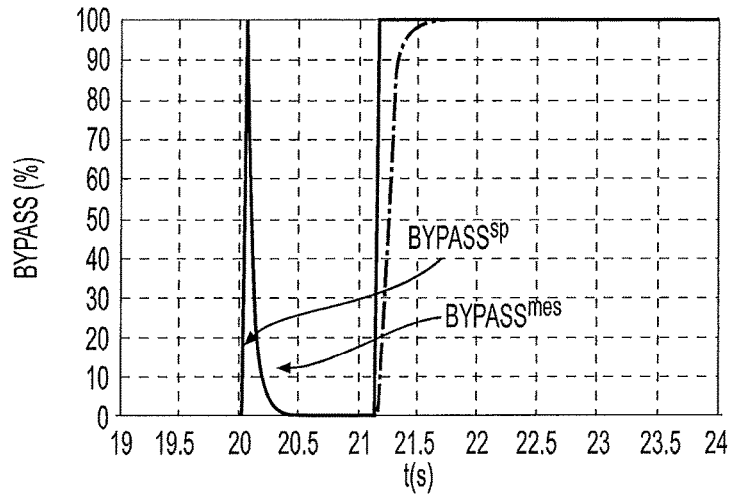
Figure 5D:
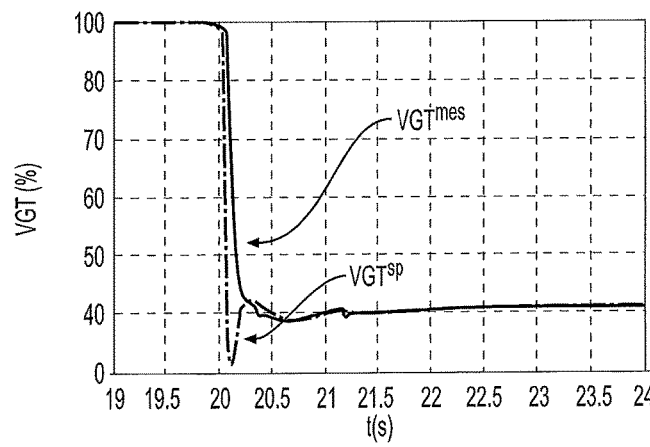

FIGS. 5a) to 5d) correspond to FIGS. 4a) to 4d) for a speed of 2500 rpm (zone Z3 in FIG. 2). In this test, positive-displacement compressor (3) is not necessary to achieve the required load. However, the open-loop control according to the invention is used under transient conditions in order to speed up the boost pressure response. It can be clearly seen in FIG. 5b) that the speed of the positive-displacement compressor is initially zero (low load), then it increases during the transient state and is eventually cancelled out when the desired boost pressure is reached. The acceleration of the system obtained using the positive-displacement compressor in the transient state can be observed in this test.

Figure 6A:
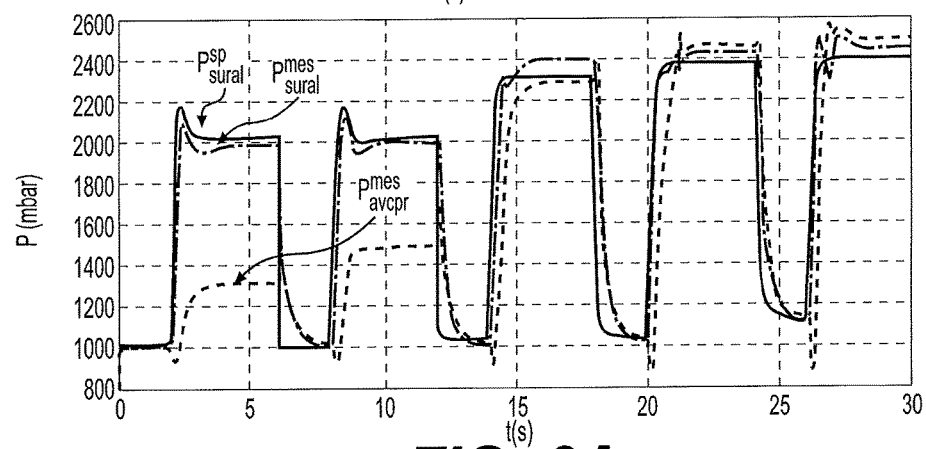
FIGS. 6a) to 6c) illustrate the boost pressure, the speed of the positive-displacement compressor, the opening of the by-pass valve and the opening of the VGT turbine for an open-loop control according to an embodiment of the method of the invention for various engine speeds: 1000, 1500, 2000, 2500 and 3000 rpm.
Figure 6B:
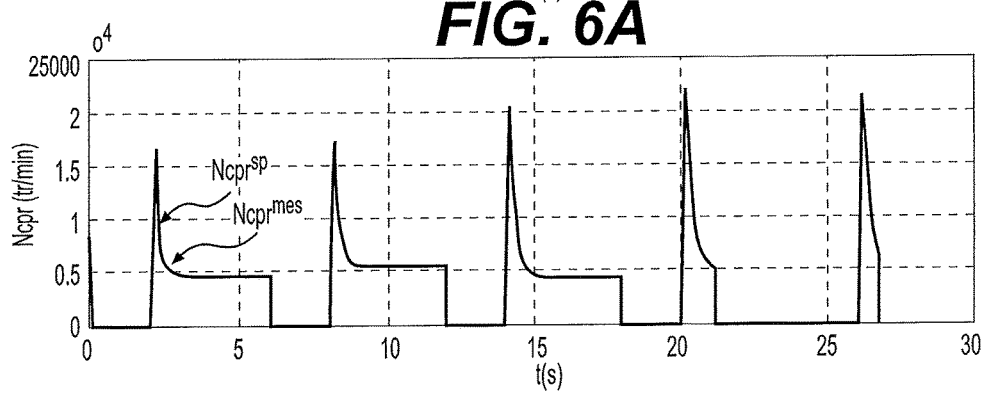
Figure 6C:
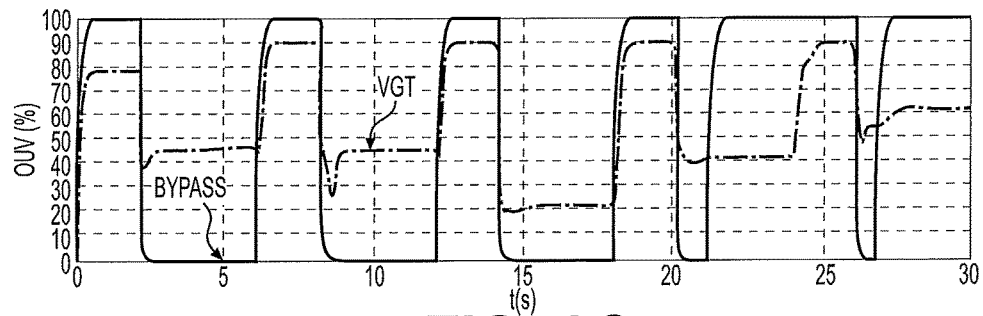

FIGS. 6a) to 6c) illustrate the application of a torque for different engine speeds: 1000, 1500, 2000, 2500 and 3000 rpm. The figures show boost pressure $P_{sural}$ (and the mechanical compressor upstream pressure), the speed of the positive-displacement compressor, and the position of the by-pass valve Bypass and of the VGT respectively.

The first three chargings (at 1000, 1500 and 2000 rpm) take place in the zone of use of the positive-displacement compressor (zone Z2 in FIG. 2). It can be clearly seen that, at the end of the transient state, the VGT is positioned in such a way that the efficiency of turbomachine (2) is optimal and by-pass valve (4) is still closed. It can however be seen that, during the transient state, the rotational speed of positive-displacement compressor (3) increases so as to speed up the system.

The next two chargings (at 2500 and 3000 rpm) take place in the zone where, under steady-state conditions, the positive-displacement compressor is preferably not engaged (zone Z3 in FIG. 2). However, the boost pressure control will attempt to close by-pass valve (4) under transient conditions so as to accelerate the boost pressure response. At the end of the transient state, positive-displacement compressor (3) is no longer used.

Figure 7A:
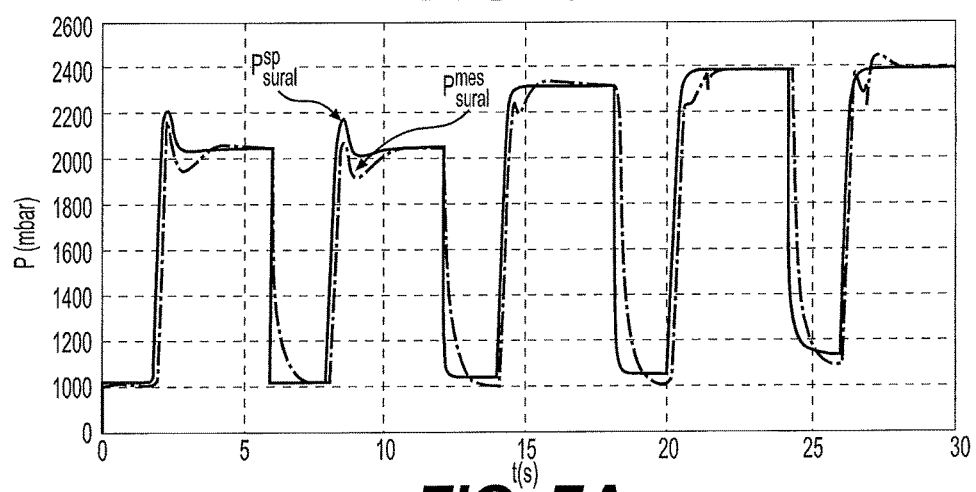
FIGS. 7a) to 7c) illustrate the boost pressure, the speed of the positive-displacement compressor, the opening of the by-pass valve and the opening of the VGT turbine for a closed-loop control according to an embodiment of the method of the invention for various engine speeds: 1000, 1500, 2000, 2500 and 3000 rpm.
Figure 7B:
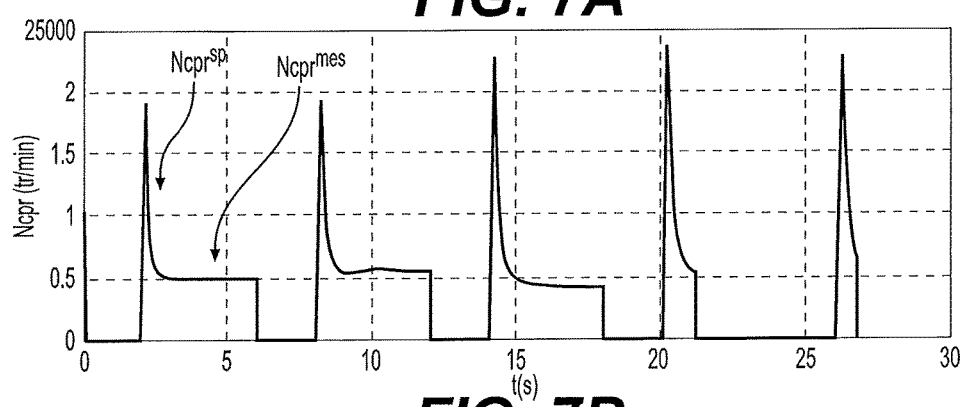
Figure 7C:
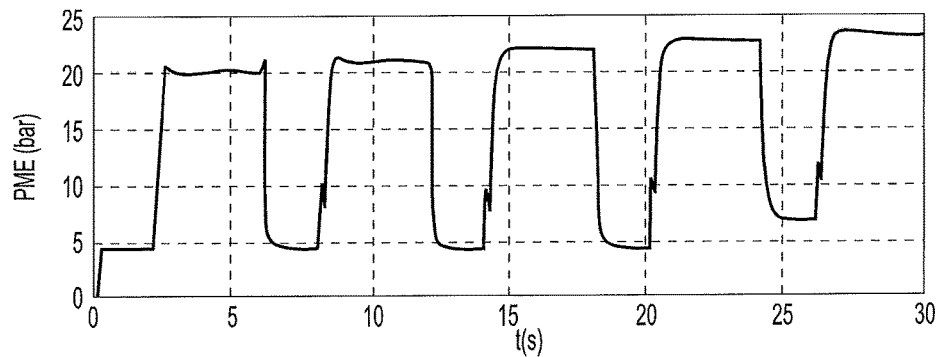

FIGS. 7a) to 7c) show the application of a torque for different engine speeds: 1000, 1500, 2000, 2500 and 3000 rpm for the closed-loop control. The figures show the boost pressure (FIG. 7a), the positive-displacement compressor speed (FIG. 7b) and the MEP (at the output of the engine, i.e. taking account of the use of the positive-displacement compressor) (FIG. 7c) respectively.

These results can be compared with those of FIG. 6 giving the results of the open-loop control. It is clear here that, in the absence of dispersion in the system, good trajectory monitoring was already provided by the open-loop strategy. The work of the feedback terms in the control is thus limited here. This greatly facilitates the calibration of the controller, which works in the vicinity of the setpoint trajectory only.

The aforementioned simulations were performed with an electrical positive-displacement compressor without accounting for the maximum torque and the maximum power of electric driving motor (11). In order to size or to limit the electric power drawn from electric generator (12) or from the battery, it is possible to saturate the rotational speed setpoint of electric motor (11) by accounting for the maximum mechanical power of the motor. From the compressor maps provided by the manufacturer, the maximum rotational speed setpoint of positive-displacement compressor (3) is determined for a given pressure ratio at the terminals of compressor (3) and for a maximum mechanical power that can be supplied by electric motor (11). This is integrated in a map of the type $$N_{cpr}^{max} = f\left(\frac{P_{apcpr}}{P_{avcpr}}, P_{mot}^{max}\right)$$

that saturates the rotational speed setpoint of the positive-displacement compressor.

Figure 8A:
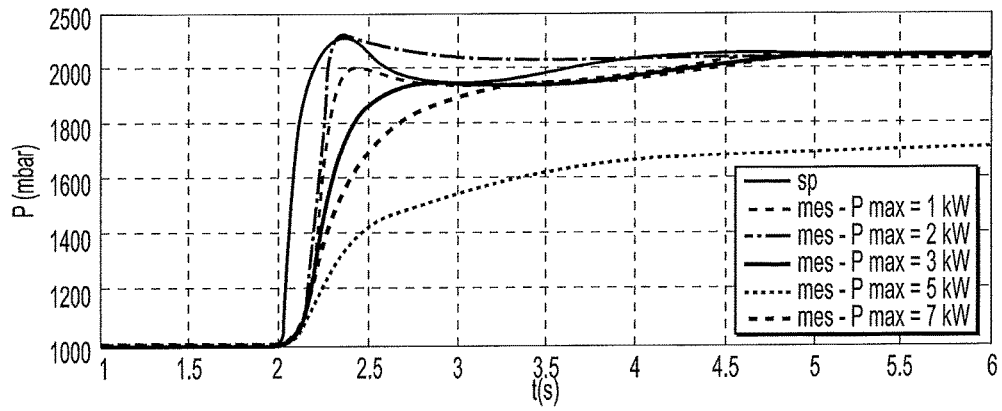
FIGS. 8a) and 8b) illustrate the boost pressure and the mechanical power of the positive-displacement compressor for a closed-loop control according to an embodiment of the method of the invention for an engine speed of 1000 rpm and various maximum mechanical powers.
Figure 8B:
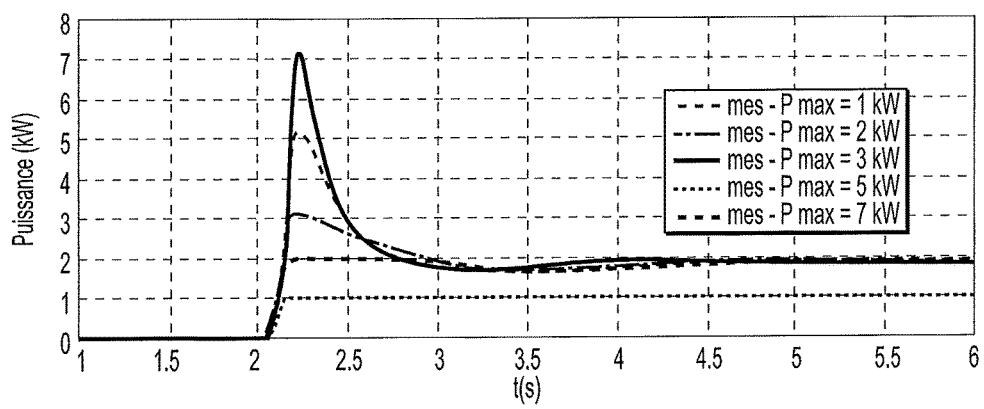

FIGS. 8a) and 8b) illustrate charging at an engine speed of 1000 rpm (zone Z2 in FIG. 2) for various maximum mechanical powers of the electric compressor (1 kW, 2 kW, 3 kW, 5 kW and 7 kW). These curves are obtained for the closed-loop control. FIG. 8a) shows the boost pressure (setpoint and measured values). FIG. 8b) shows the mechanical power measured at the positive-displacement compressor terminals. The torque request occurs at 2 seconds. The required boost pressure is then around 2000 mbar.

These results show that it is better to have a minimum mechanical power of 2 kW in order to achieve the boost pressure. Conversely, above 5 kW, the boost pressure dynamics no longer improves.

The invention claimed is:

1. A method for controlling a combustion engine equipped with a supercharging system comprising a turbocharger and a positive-displacement compressor for compressing a gas mixture at an intake of the combustion engine and a by-pass circuit in parallel with the positive-displacement compressor, including a controllable by-pass valve, the positive-displacement compressor being driven by an electric motor, the method comprising:
   a) acquiring a boost pressure setpoint;
   b) constructing a filling model of a supercharged volume contained in the intake of the combustion engine between intake valves of the engine and the positive-displacement compressor and the by-pass valve;
   c) converting the boost pressure setpoint to a rotational speed setpoint for the positive-displacement compressor using the filling model of the supercharged volume; and
   d) controlling the electric motor according to the rotational speed setpoint for the positive-displacement compressor.

2. The method as claimed in claim 1, wherein a pressure and a temperature are determined upstream from the positive-displacement compressor, a boost temperature is determined at the intake of the combustion engine and the filling model connects a boost pressure to a rotational speed of the positive-displacement compressor from the pressure and the temperature upstream from the positive-displacement compressor and the boost temperature.

3. The method as claimed in claim 2, wherein the pressure and the boost temperature are determined by pressure and temperature detectors upstream from an intake manifold of the combustion engine.

4. The method as claimed in claim 3, wherein the pressure and the temperature upstream from the positive-displacement compressor are by pressure and temperature detectors respectively arranged upstream from the compressor or by an estimator.

5. The method as claimed in claim 4, wherein the filling model is defined by a filling equation of the supercharged volume defined by a flow rate conservation formula wherein:

$$\dot{P}_{sural} = \frac{RT_{sural}}{V_{sural}}(D_{cpr} - D_{bp} - D_{asp})$$

with $\dot{P}_{sural}$ being the derivative of the boost pressure $P_{sural}$ with respect to time, R being the ideal gas constant, $V_{sural}$ being the supercharged volume, $D_{cpr}$ being flow coming from the positive-displacement compressor, $D_{bp}$ being flow from the by-pass valve that is a function of opening of the by-pass valve and $D_{asp}$ being the flow into cylinders of the engine.

6. The method as claimed in claim 3, wherein the filling model is defined by a filling equation of the supercharged volume defined by a flow rate conservation formula wherein:

$$\dot{P}_{sural} = \frac{RT_{sural}}{V_{sural}}(D_{cpr} - D_{bp} - D_{asp})$$

with $\dot{P}_{sural}$ being the derivative of the boost pressure $P_{sural}$ with respect to time, R being the ideal gas constant, $V_{sural}$ being the supercharged volume, $D_{cpr}$ being flow coming from the positive-displacement compressor, $D_{bp}$ being flow from the by-pass valve that is a function of opening of the by-pass valve and $D_{asp}$ being the flow into cylinders of the engine.

7. The method as claimed in claim 2, wherein the pressure and the temperature upstream from the positive-displacement compressor are determined by pressure and temperature detectors disposed upstream from the compressor or by an estimator.

8. The method as claimed in claim 7, wherein the filling model is defined by a filling equation of the supercharged volume defined by a flow rate conservation formula wherein:

$$\dot{P}_{sural} = \frac{RT_{sural}}{V_{sural}}(D_{cpr} - D_{bp} - D_{asp})$$

with $\dot{P}_{sural}$ the derivative of the boost pressure $P_{sural}$ with respect to time, R being the ideal gas constant, $V_{sural}$ being the supercharged volume, $D_{cpr}$ being flow coming from the positive-displacement compressor, $D_{bp}$ being flow from the by-pass valve that is a function of opening of the by-pass valve and $D_{asp}$ being the flow into cylinders of the engine.

9. The method as claimed in claim 2, wherein the filling model is defined by a filling equation of the supercharged volume defined by a flow rate conservation formula wherein:

$$\dot{P}_{sural} = \frac{RT_{sural}}{V_{sural}}(D_{cpr} - D_{bp} - D_{asp})$$

with $\dot{P}_{sural}$ being the derivative of the boost pressure $P_{sural}$ with respect to time, R being the ideal gas constant, $V_{sural}$ being the supercharged volume, $D_{cpr}$ being flow coming from the positive-displacement compressor, $D_{bp}$ being flow from the by-pass valve that is a function of opening of the by-pass valve and $D_{asp}$ being the flow into cylinders of the engine.

10. A The method as claimed in claim 1, wherein the filling model is defined by a filling equation of the supercharged volume defined by a flow rate conservation formula wherein:

$$\dot{P}_{sural} = \frac{RT_{sural}}{V_{sural}}(D_{cpr} - D_{bp} - D_{asp})$$

with $\dot{P}_{sural}$ being the derivative of the boost pressure $P_{sural}$ with respect to time, R being the ideal gas constant, $V_{sural}$ being the supercharged volume, $D_{cpr}$ being flow coming from the positive-displacement compressor, $D_{bp}$ being flow from the by-pass valve that is a function of opening of the by-pass valve and $D_{asp}$ being the flow into cylinders of the engine.

11. The method as claimed in claim 10, wherein flow $D_{bp}$ from the by-pass valve is determined by a pressure drop relation at the by-pass valve using a Barré Saint Venant equation expressed as $D_{bp} = A_{bp}(\text{Bypass}) \times f(P_{avcpr}, P_{sural}, T_{avcpr})$ with $A_{bp}(\text{Bypass})$ being the opening area of the by-pass valve and f being flow rate per unit of area defined by a formula expressed as:

$$f(P_{avcpr}, P_{sural}, T_{avcpr}) = \frac{P_{sural}}{\sqrt{RT_{avcpr}}}$$

$$\begin{cases} \left(\frac{P_{avcpr}}{P_{sural}}\right)^{\frac{1}{\gamma}} \sqrt{\frac{2}{\gamma-1}\left(1-\left(\frac{P_{avcpr}}{P_{sural}}\right)^{\frac{\gamma-1}{\gamma}}\right)} & \text{if } \left(\frac{P_{avcpr}}{P_{sural}}\right) > \left(\frac{2}{\gamma-1}\right)^{\frac{\gamma}{\gamma+1}} \\ \left(\frac{2}{\gamma+1}\right)^{\frac{\gamma+1}{\gamma-1}} & \text{if } \left(\frac{P_{avcpr}}{P_{sural}}\right) \leq \left(\frac{2}{\gamma-1}\right)^{\frac{\gamma}{\gamma+1}} \end{cases}$$

with $\gamma$ being the specific capacity ratio of the gases.

12. The method as claimed in claim 11, wherein the filling model is an open-loop filling model expressed as:

$$N_{cpr}^{sp} = \phi^{-1}\left(\frac{\frac{\dot{P}_{sural}^{sp} \cdot V_{sural}}{R \cdot T_{sural}} + \delta_{PI} + A_{bp}(\text{Bypass}) \cdot f(P_{avcpr}, P_{sural}^{sp}, T_{avcpr}) + D_{asp}^{sp}}{\rho_{avcpr}}, \frac{P_{sural}^{sp} + \delta P}{P_{avcpr}}\right)$$

with $\rho_{avcpr}$ being density of the gases flowing through the positive-displacement compressor, given by $$\rho_{avcpr} = \frac{P_{avcpr}}{RT_{avcpr}},$$

$\phi$ being the volumetric flow rate of the compressor, $D_{asp}^{sp}$ being a setpoint flow of gas into the cylinders of engine and $\delta P$ being pressure drops in an air cooler positioned between the turbocharger and the compressor.

13. The method as claimed in claim 10, wherein the filling model is an open-loop filling model expressed as:

$$N_{cpr}^{sp} = \phi^{-1}\left(\frac{\frac{\dot{P}_{sural}^{sp} \cdot V_{sural}}{R \cdot T_{sural}} + A_{bp}(\text{Bypass}) \cdot f(P_{avcpr}, P_{sural}^{sp}, T_{avcpr}) + D_{asp}^{sp}}{\rho_{avcpr}}, \frac{P_{sural}^{sp} + \delta P}{P_{avcpr}}\right)$$

with $\rho_{avcpr}$ being density of the gases flowing through the positive-displacement compressor, given by $$\rho_{avcpr} = \frac{P_{avcpr}}{RT_{avcpr}},$$

$\phi$ being volumetric flow rate of the compressor, $D_{asp}^{sp}$ being a setpoint flow of gas into the cylinders of the engine and $\delta P$ being pressure drops in an air cooler positioned between the turbocharger and the compressor.

14. The method as claimed in claim 10, wherein the filling model is a closed-loop filling model expressed by as:

$$N_{cpr}^{sp} =$$

$$\phi^{-1}\left(\frac{\frac{\dot{P}_{sural}^{sp} \cdot V_{sural}}{R \cdot T_{sural}} + \delta_{PI} + A_{bp}(\text{Bypass}) \cdot f(P_{avcpr}, P_{sural}^{sp}, T_{avcpr}) + D_{asp}^{sp}}{\rho_{avcpr}}, \frac{P_{sural}^{sp} + \delta P}{P_{avcpr}}\right)$$

with $\delta_{PI} = -K_p(P_{sural} - P_{sural}^{sp}) - K_i \int_0^t (P_{sural} - P_{sural}^{sp}) dt$, $\rho_{avcpr}$ being density of the gases flowing through positive-displacement compressor given by $$\rho_{avcpr} = \frac{P_{avcpr}}{RT_{avcpr}},$$

being volumetric flow rate of the compressor, $D_{asp}^{sp}$ being setpoint flow of gas into the cylinders of the engine, $\delta P$ being pressure drops in an air cooler positioned between the turbocharger and the compressor, and $K_i$ and $K_p$ being calibration parameters of a loop.

15. The method as claimed in claim 1, wherein the by-pass valve is closed when the electric motor is controlled.

16. The method as claimed in claim 1, wherein the by-pass valve is closed when a pressure difference between the boost pressure setpoint and pressure upstream from the positive-displacement compressor is greater than a threshold and open otherwise.

17. The method in accordance with claim 1, wherein the electric motor is powered by a generator positioned on a crankshaft of the combustion engine.

18. The method in accordance with claim 17, wherein the electric motor is powered by an electric battery.

19. The method in accordance with claim 17, wherein a mechanical power rating of the positive-displacement compressor ranges between 2 and 5 kW.

\* \* \* \* \*